Figure 4:
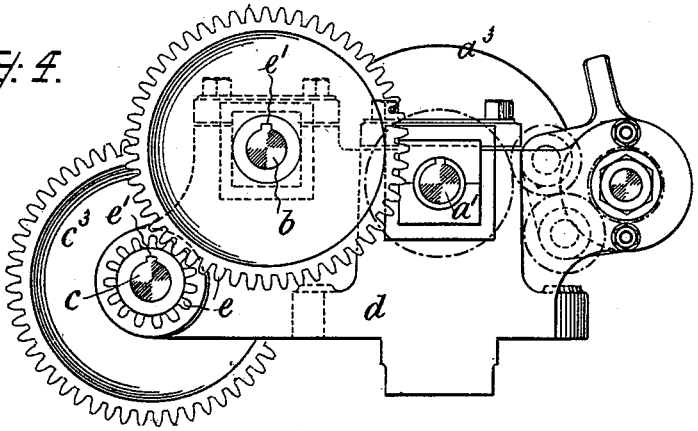

No. 619,859. Patented Feb. 21, 1899.
W. BUCKLEY.
LATHE.
(Application filed Apr. 4, 1898.)
(No Model.) 2 Sheets—Sheet 1.
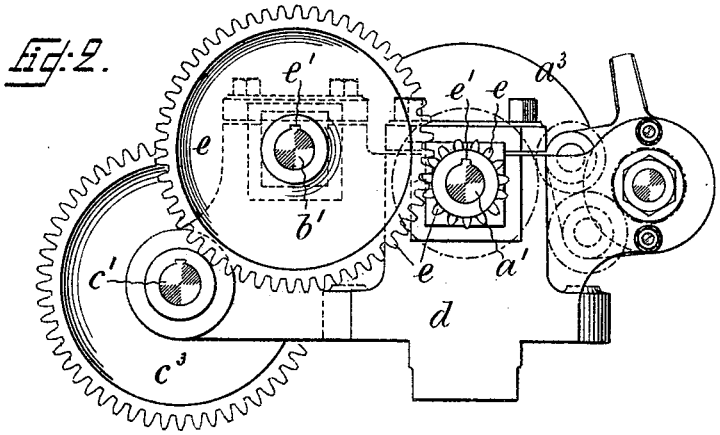
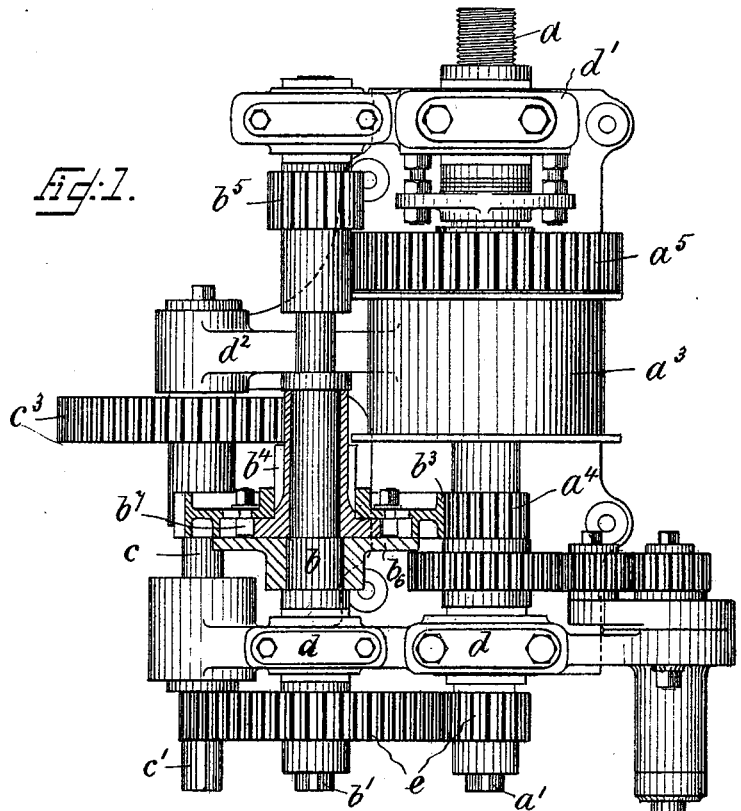

No. 619,859. Patented Feb. 21, 1899.
W. BUCKLEY.
LATHE.
(Application filed Apr. 4, 1898.)
(No Model.) 2 Sheets—Sheet 2.

Witnesses:
M. C. Pinckney
C. Holloway

Inventor:
William Buckley,
By J. E. M. Bowen
Attorney.

UNITED STATES PATENT OFFICE.

WILLIAM BUCKLEY, OF SHEFFIELD, ENGLAND.

LATHE.

SPECIFICATION forming part of Letters Patent No. 619,859, dated February 21, 1899.

Application filed April 4, 1898. Serial No. 676,298. (No model.)

*To all whom it may concern:*

Be it known that I, WILLIAM BUCKLEY, a subject of the Queen of Great Britain and Ireland, residing at Sheffield, in the county of York, England, have invented certain new and useful Improvements in Lathes; and I do hereby declare the following to be a full, clear, and exact description of the invention, such as will enable others skilled in the art to which it appertains to make and use the same.

This invention relates to sliding, surfacing, screw-cutting, and other similar lathes for heavy work, and has reference to certain new and useful improvements upon the invention for which Letters Patent of the United States of America No. 457,070 were granted to me, the objects of the invention being to enable the speed and power of the lathe to be regulated to a greater nicety than can be done by the means described in the specification of said patent, to enable the lathe-spindle to be always driven at a speed suitable to the requirements of the work, and to diminish liability of the belt to slip and the consequent vibration of the lathe and work.

To this end the invention is characterized by the combination, in such lathes, of a lathe main spindle and first and second counter-spindles so arranged that the first counter-spindle is equidistant from the main spindle and from the second counter-spindle and so adapted that the rear ends of all three such spindles project beyond their bearings and are adapted to receive interchangeable change-wheels, a reversible series of change-wheels interchangeably applicable to such extending spindle ends and serving to connect the first counter-spindle and the main spindle, so as to drive the latter from the former, or to connect the two counter-spindles, so as to drive the first from the second, as required, a single cylindrical pulley of a width much greater than that of the single steps of a cone-pulley usable with a lathe of the same size (and which may be as wide as the substitution of the single pulley for the stepped pulley will permit) and of a diameter much greater than that of the step of the largest diameter of a cone-pulley usable with a lathe of the same size, (and which may be as large as the diameter of the adjacent back gearing or the proximity of the bed of the head-stock and of the first counter-spindle will permit,) adapted to be driven at a uniform speed irrespective of the different speeds it imparts to the main spindle and serving to give a broad belt-surface of large diameter, enabling a broad thick belt to be used, and adjustable back gearing serving to connect the driving-pulley with the first counter-spindle when the latter and the main spindle are connected by the change-wheels and to connect the driving-pulley with the second counter-spindle and the first counter-spindle with the main spindle when the counter-spindles are connected by the change-wheels, the whole being adapted to coöperate in such manner that the lathe main spindle will be driven from its rear end directly by the first counter-spindle when such two spindles are connected by the change-wheels and the main spindle is required to be driven at any of the relatively high speeds for turning or boring articles of relatively small diameters, and will be driven from its fore end by the adjustable gearing carried by the head-stock bearings when the counter-spindles are connected by the change-wheels and the main spindle is required to be driven at any of the relatively low speeds for turning or boring articles of relatively large diameters, and that between the extremes of such higher and lower speeds so obtainable the gradations of change will be regular and of small difference and in number determined by that of the reversible series of change-wheels employed and the times they are interchangeably usable, as aforesaid, and so that both the right peripheral speed of the work in relation to the cutting-tool and the necessary power to turn the work to attain such speed may be obtained in relation to any article the lathe can take in, and enabling a uniform cut to be taken at all speeds of the lathe-spindle.

Figure 3:
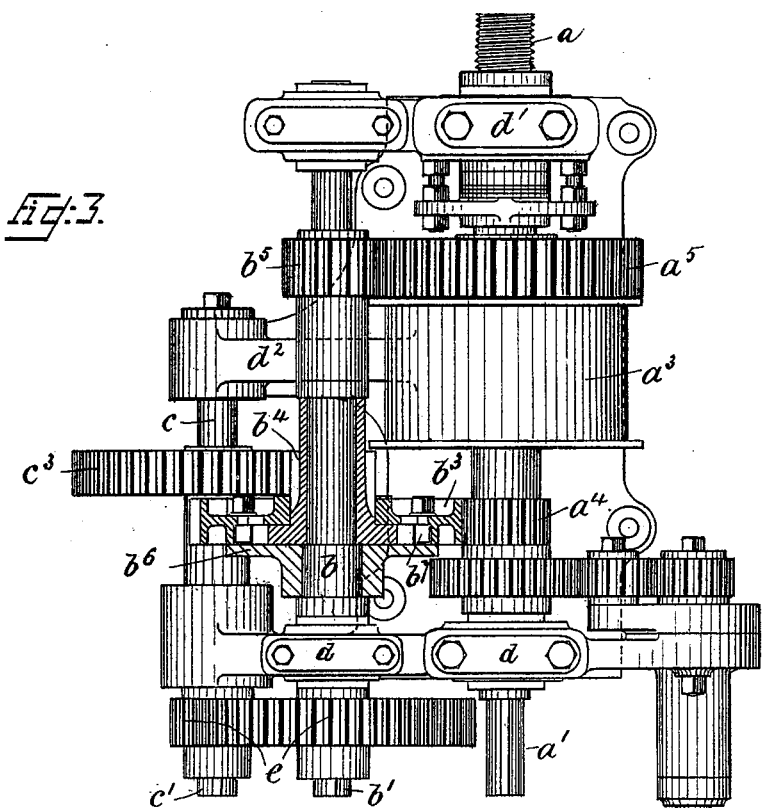

On the drawings, Figure 1 represents a plan, partly in section, of the improved lathe, showing the parts as connected for driving the lathe-spindle at relatively high speeds. Fig. 2 is an end elevation of Fig. 1. Fig. 3 represents a like view to Fig. 1, but shows the parts as connected for driving the lathe-spindle at relatively low speeds; and Fig. 4 is an elevation of Fig. 3.

$a$ represents the main spindle, having a key-fitted prolonged end $a'$.

$b$ represents the first counter-spindle, having a key-fitted prolonged end $b'$, and $c$ represents the second counter-spindle, having a key-fitted prolonged end $c'$, all such spindles being mounted in the head-stock bearings $d$ $d'$ or $d$ $d^2$, with the counter-spindle $b$ equidistant from the main spindle $a$ and from the counter-spindle $c$ and with their prolonged key-fitted ends extending beyond the rear bearings $d$.

$e$ represents the change-wheels, which have keyways $e'$ and are interchangeably applicable to the key-fitted ends of the spindles $a$ $b$ $c$ either for connecting the spindles $b$ $a$ at one time or the spindles $c$ $b$ at one time, accordingly as required, and $a^3$ represents the broad plain-band driving-pulley of one diameter and large size.

The main spindle carries the pulley $a^3$, which runs freely thereon and is fast to a pinion $a^4$, and also a wheel $a^5$, which is fast to the spindle. The first counter-spindle carries a wheel $b^3$, which runs freely thereon and is driven by the pinion $a^4$ and is fast to a pinion $b^4$ and also a pinion $b^5$, which can be slid into or out of gear with the wheel $a^5$, but is keyed to the spindle, so as to be rotated thereby, and also a clutch-plate $b^6$, which is fast to the spindle and to which the wheel $b^3$ may be connected by a clutch $b^7$, and the second counter-spindle carries a wheel $c^3$, which can be slid into or out of gear with the pinion $b^4$, but is keyed to the spindle, so as to rotate the same. This adjustable gearing permits of the lathe being driven double-geared, Figs. 1 and 2, for turning or boring relatively small diameters and working at relatively high speeds, the main spindle then being driven at its rear end from the band-pulley through the gearing $a^4$ $b^3$, clutch-plate $b^6$, spindle $b$, and the change-wheels $e$, connecting the spindles $b$ $a$ and the wheel $c^3$ and pinion $b^5$, being slid out of engagement, respectively, with the pinion $b^4$ and the wheel $a^5$, or of the lathe being driven quadruple-geared, Figs. 3 and 4, for turning or boring relatively large diameters and working at relatively low speeds, the main spindle then being driven at its rear end from the band-pulley through the gearing $a^4$ $b^3$ $b^4$ $c^3$, spindle $c$, change-wheels $e$, connecting the spindles $c$ $b$, spindle $b$, and the pinion $b^5$, driving the wheel $a^5$, and the wheel $b^3$, being disconnected from the clutch-plate $b^6$.

The advantage due directly to the broad cylindrical driving-pulley of enlarged diameter is that it enables the lathe to be driven at a uniform speed and power and enables a broad thick belt to be used therewith, which enables much more power to be put into the lathe than can be put in by a stepped-cone pulley with diminishing diameters and the narrow thin belt necessarily used therewith and avoids the liability of slip incidental to such narrow belts when on the smaller diameters of the stepped-cone pulley, so enabling the power to be transmitted with greater certainty, while the advantage obtained by the prolongation of the ends of the three said spindles conjunctively, and conjunctively with the placing of the first counter-spindle equidistant from the other two spindles, and with the use of the reversible series of change-wheels directly applicable to the projecting spindle ends, and interchangeably applicable for connecting the first counter-spindle and the main spindle or the two counter-spindles as required, and with the adjustable gearing carried by the head-stock bearings is the ready adaptability of the double-geared arrangement, Figs. 1 and 2, for relatively small diameters and quick speeds, and of the quadruple-geared arrangement, Figs. 3 and 4, for relatively large diameters and low speeds, and the ease and regularity with which the speed of the lathe can be gradually decreased and the power of the lathe can be gradually increased to the maximum obtainable, whereby both the right speed and the right power can be obtained for any article the lathe can take in, and whereby the speed and power of the lathe can be regulated to a much greater nicety than can be effected by the means described in the specification of my said former patent.

When the lathe is geared as represented in Figs. 1 and 2 and the largest one of the reversible series of change-wheels is applied to the first counter-spindle and drives the smallest one of the series applied to the main spindle, the main spindle is driven at the speed of the driving-pulley. From this point the speed of the main spindle can be reduced and the power of the lathe can be increased without varying the speed of the driving-pulley by steps of small gradation (until the lowest speed and the highest power obtainable with the lathe so geared is obtained) simply by applying the reversible series of change-wheels in their proper order of rotation and in complementary couples to the spindles $b$ $a$ until eventually the smallest change-wheel is applied to the first counter-spindle and drives the largest change-wheel applied to the main spindle. Should a less speed and a greater power be required than can be obained by the wheels $a^4$, $b^3$, and $e$, the lathe is geared as represented in Figs. 3 and 4, when such requirements can be obtained by steps of small gradation (until the lowest speed and the highest power obtainable with the lathe so geared is obtained) by applying the reversible series of change-wheels in their proper order of rotation and in complementary couples to the counter-spindles, beginning and ending, as described, with reference to their application to the first counter-spindle and the main spindle, Figs. 1 and 2.

Having now described my invention, what

I claim as new, and desire to secure by Letters Patent, is—

In lathes of the nature aforesaid, in combination, a lathe main spindle and first and second counter-spindles arranged with the first counter-spindle equidistant from each of the other spindles, and with the ends of all three spindles prolonged beyond their rear bearings and adapted to receive interchangeable change-wheels, a reversible series of change-wheels interchangeably applicable to all such extending spindle ends and serving to connect the first counter-spindle and the main spindle so as to drive the latter from the former, or to connect the two counter-spindles so as to drive the first from the second, as required, a broad cylindrical driving-pulley of large diameter adapted to be driven at a uniform speed and to give a broad belt-surface enabling a broad thick belt to be used, and a uniform belt purchase, and adjustable back gearing serving to connect the driving-pulley with the first counter-spindle when the latter and the main spindle are connected by the change-wheels, and to connect the driving-pulley with the second counter-spindle and the first counter-spindle with the main spindle when the counter-spindles are connected by the change-wheels, as set forth.

In testimony whereof I affix my signature in presence of two witnesses.

WILLIAM BUCKLEY.

Witnesses:
JOHN THOS. PAGAN,
FREDERICK WILLIAM GREEN.